United States Patent
Chang

(10) Patent No.: US 8,117,504 B2
(45) Date of Patent: Feb. 14, 2012

(54) AUTOMATIC KEYBOARD TESTING SYSTEM

(75) Inventor: Pei-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 225 days.

(21) Appl. No.: 12/470,148

(22) Filed: May 21, 2009

(65) Prior Publication Data

US 2010/0268994 A1    Oct. 21, 2010

(30) Foreign Application Priority Data

Apr. 17, 2009  (TW) ................................ 98112743 A

(51) Int. Cl.
  *G06F 11/00*   (2006.01)
(52) U.S. Cl. ......................................................... 714/44
(58) Field of Classification Search ....................... 714/44
  See application file for complete search history.

(56) References Cited

U.S. PATENT DOCUMENTS

| | | | | |
|---|---|---|---|---|
| 4,573,152 A * | 2/1986 | Greene et al. | .................... | 714/44 |
| 4,802,164 A * | 1/1989 | Fukuoka et al. | ................ | 714/44 |
| 4,888,600 A * | 12/1989 | Anderson et al. | ................ | 341/24 |
| 4,964,124 A * | 10/1990 | Burnett | ........................... | 714/44 |
| 5,220,323 A * | 6/1993 | Ito et al. | ........................... | 341/24 |
| 5,269,004 A * | 12/1993 | Comerford et al. | ........... | 345/168 |
| 6,178,527 B1* | 1/2001 | Vidales | ........................... | 714/44 |
| 6,314,825 B1* | 11/2001 | Fan | ................................. | 73/865.3 |
| 2003/0028826 A1* | 2/2003 | Balluff | ........................... | 714/44 |
| 2007/0038583 A1* | 2/2007 | Bleumer et al. | ............... | 705/408 |
| 2007/0229313 A1* | 10/2007 | Den Ouden | ..................... | 341/22 |
| 2008/0120603 A1* | 5/2008 | Chace | ........................... | 717/126 |

* cited by examiner

*Primary Examiner* — Scott Baderman
*Assistant Examiner* — Yair Leibovich
(74) *Attorney, Agent, or Firm* — Kirton & McConkie; Evan R. Witt

(57) ABSTRACT

An automatic keyboard testing system includes a computer, an automatic testing program and a testing frame. A keyboard circuit board to be tested in placed on the testing frame. The automatic testing program is installed in the computer for generating a testing signal and has a predetermined time period. The testing frame generates a simulating signal according to the testing signal and conducts a key intersection point corresponding to the simulating signal, so that the keyboard circuit board output a key scanning code corresponding to the conducted key intersection point to the computer. The automatic testing program discriminates whether the key scanning code is transmitted to the computer within the predetermined time period.

14 Claims, 8 Drawing Sheets

AUTOMATIC KEYBOARD TESTING SYSTEM

FIELD OF THE INVENTION

The present invention relates to a testing system, and more particularly to a keyboard testing system for testing a keyboard device.

BACKGROUND OF THE INVENTION

With rapid development of electronic and information industries, computers and the peripheral device thereof become essential parts in our daily lives. In addition to the working purposes, computers can be employed as amusement tools. In the computer systems, input devices play important roles for communicating the computer and the user. The common input devices of the computer systems include for example mice, keyboards or a trackballs. Take a keyboard device having multiple keys for example. By depressing the keys of the keyboard device, corresponding instructions are inputted to the computer.

FIG. 1 is a schematic view illustrating the outward appearance of a conventional keyboard device. There are multiple keys mounted on the surface of the keyboard device 1. These keys include for example ordinary keys 10, numeric keys 11 and function keys 12. When one or more keys are depressed, the computer executes a corresponding function. For example, when the ordinary keys 10 are depressed, corresponding English letters or symbols are inputted into the computer system. The function keys 12 (F1~F12) can be programmed to cause the application program to perform certain functions.

In the fabricating process of the keyboard device, a testing procedure is performed to assure normal functions of the keyboard device. The testing procedure includes testing the circuit board of the keyboard device and testing the overall functions of the assembled keyboard device. By testing the circuit board, the manufacturer could realize whether any defects are present in the circuit board. If the procedure of testing the circuit board is eliminated, the keyboard device needs to be dissembled to debug the circuit board after the keyboard device is assembled and some defects are found. It is troublesome and time-consuming to dissemble the keyboard device and debug the circuit board.

FIG. 2 is a schematic circuit diagram illustrating the internal circuitry of the conventional keyboard device. The keyboard device 1 includes a microprocessor 13 and a keyboard scanning matrix 14. The microprocessor 13 is connected with the keyboard scanning matrix 14 through multiple pins. The other parts of the microprocessor 13 are known in the art, and are not redundantly described herein. The keyboard scanning matrix 14 includes multiple scan input lines X0~X7 and multiple scan output lines Y0~Y17. The scan input lines X0~X7 and the scan output lines Y0~Y17 crisscross to define a plurality of keys on the surface of the keyboard device 1.

Since the keyboard scanning matrix 14 is an 8×18 matrix, there are a total of 144 intersection points correlating to 144 keys on the surface of the keyboard device 1. That is, if there are 144 keys on the surface of the keyboard device 1, the internal circuit of the keyboard device 1 should have at least 26 scan lines.

Hereinafter, a process of testing the keyboard circuit board according to the prior art will be illustrated with reference to FIG. 2. After the keyboard circuit board is produced, the keyboard circuit board is connected with a testing module. The testing module includes 26 switches and 26 light emitting diodes (LEDs). These 26 switches are respectively connected with the scan input lines X0~X7 and the scan output lines Y0~Y17. These 26 light emitting diodes are respectively connected with the 26 switches. Next, the 26 switches are manually depressed one by one. If the light emitting diode connected with the depressed switch illuminates, the scan input line or the scan output line that is connected with the depressed switch passes the test. On the other hand, if the light emitting diode connected with the depressed switch does not illuminate, the scan input line or the scan output line that is connected with the depressed switch fail to pass the test. In other words, the tester could discriminate whether the function of the keyboard circuit board is normal according to the illuminating statuses of the light emitting diodes.

Although the convention process for testing the circuit board is simple, there are still some drawbacks. For example, it is time-consuming and labor-intensive to successively test the switches. In addition, since too many keys need to be manually tested, the tester may repeatedly depress the same keys or miss depressing some keys. Under this circumstance, the testing procedure should be performed again. The manual testing process is ineffective and costly.

SUMMARY OF THE INVENTION

It is an object of the present invention to provide an automatic keyboard testing system without the need of the human testing operations.

Another object of the present invention provides an automatic keyboard testing system for quickly testing a keyboard device.

In accordance with an aspect of the present invention, there is provided an automatic keyboard testing system for automatically testing a keyboard circuit board of a keyboard device. The keyboard circuit board includes multiple key intersection points correlating to respective key scanning codes. The automatic keyboard testing system includes a computer, an automatic testing program and a testing frame. The automatic testing program is installed in the computer for generating a testing signal and has a predetermined time period. The testing frame is connected to the computer and the keyboard circuit board. The testing frame generates a simulating signal according to the testing signal and conducts a key intersection point corresponding to the simulating signal, so that the keyboard circuit board output a key scanning code corresponding to the conducted key intersection point to the computer. The automatic testing program outputs an error message if the key scanning code has not been transmitted to the computer within the predetermined time period.

In an embodiment, the automatic testing program discriminates whether the key scanning code is accurate if the key scanning code is transmitted to the computer within the predetermined time period.

In an embodiment, the automatic testing program further outputs the error message once the key scanning code is determined as an erroneous code, or the automatic testing program outputs passing message once the key scanning code is determined as an accurate code.

In an embodiment, the automatic testing program has a predetermined testing script, and the automatic testing program generates the testing signal according to the testing script.

In an embodiment, the automatic testing program further comprises a key scanning code table, and the automatic testing program discriminates whether the key scanning codes are accurate according to the testing script and the key scanning code table.

In an embodiment, the testing frame further includes a control panel, multiple thimbles, a power wire and a signal wire. The control panel generates the simulating signal according to the testing signal. The thimbles are contacted with the keyboard circuit board for transmitting the simulating signal to the keyboard circuit board. The power wire is connected with the computer for transmitting electricity from the computer to the testing frame. The signal wire is connected with the computer for transmitting the testing signal.

In an embodiment, the power wire is a universal serial bus (USB) connecting wire.

In an embodiment, the testing signal is transmitted from the automatic testing program to the control panel through the signal wire after the signal wire is connected with the computer.

In an embodiment, the signal wire is a RS232 connecting wire.

In an embodiment, the control panel further includes an analog switch connected with the thimbles. The analog switch is connected with multiple key intersection points after the keyboard circuit board is placed on the testing frame and contacted with the thimbles.

In an embodiment, when the control panel receives the testing signal and outputs the simulating signal, the key intersection point corresponding to the simulating signal is conducted by the analog switch according to the simulating signal.

In an embodiment, the analog switch is a CD4066 switch.

In an embodiment, the computer is also connected with a monitor, and a testing interface is shown on the monitor.

In an embodiment, the testing interface includes a testing key zone, a key intersection point zone, a testing key number indicating zone and a testing status zone.

In an embodiment, the key intersection points are defined by multiple scan input lines and multiple scan output lines.

In an embodiment, the key intersection points are defined by eight scan input lines and eighteen scan output lines.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
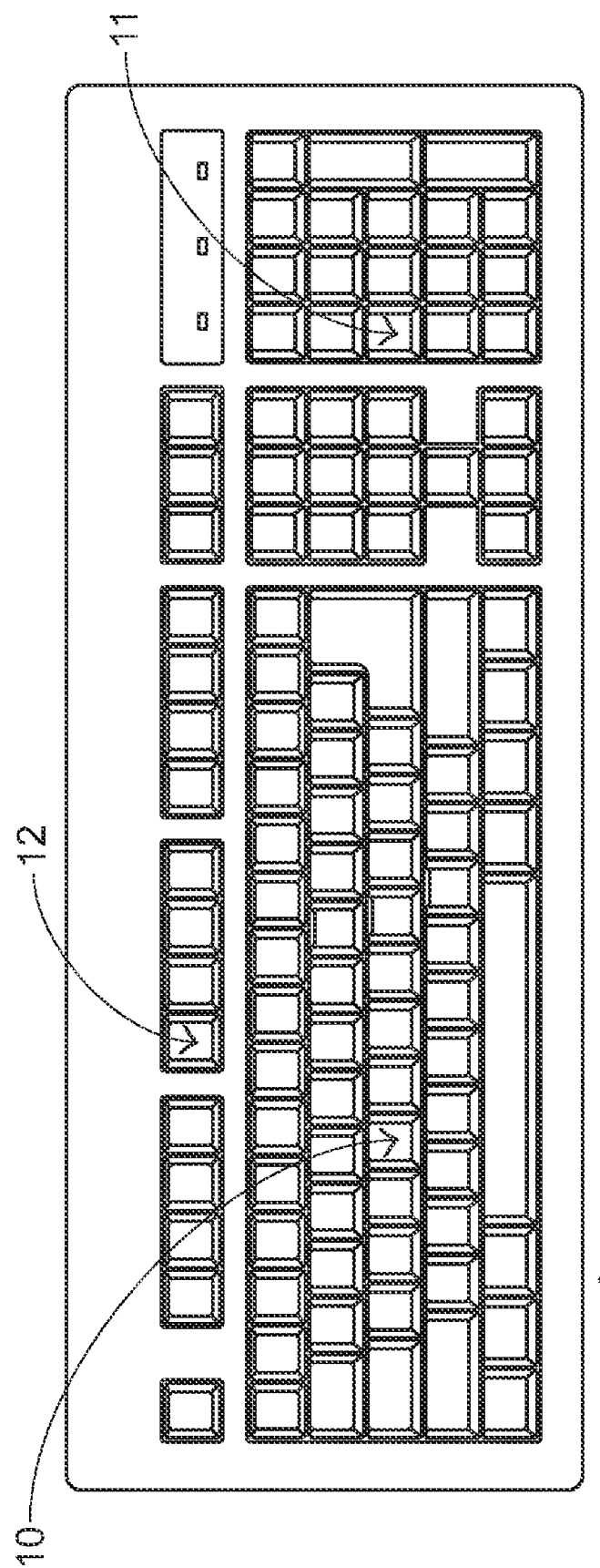
FIG. 1 is a schematic view illustrating the outward appearance of a conventional keyboard device.
Figure 2:
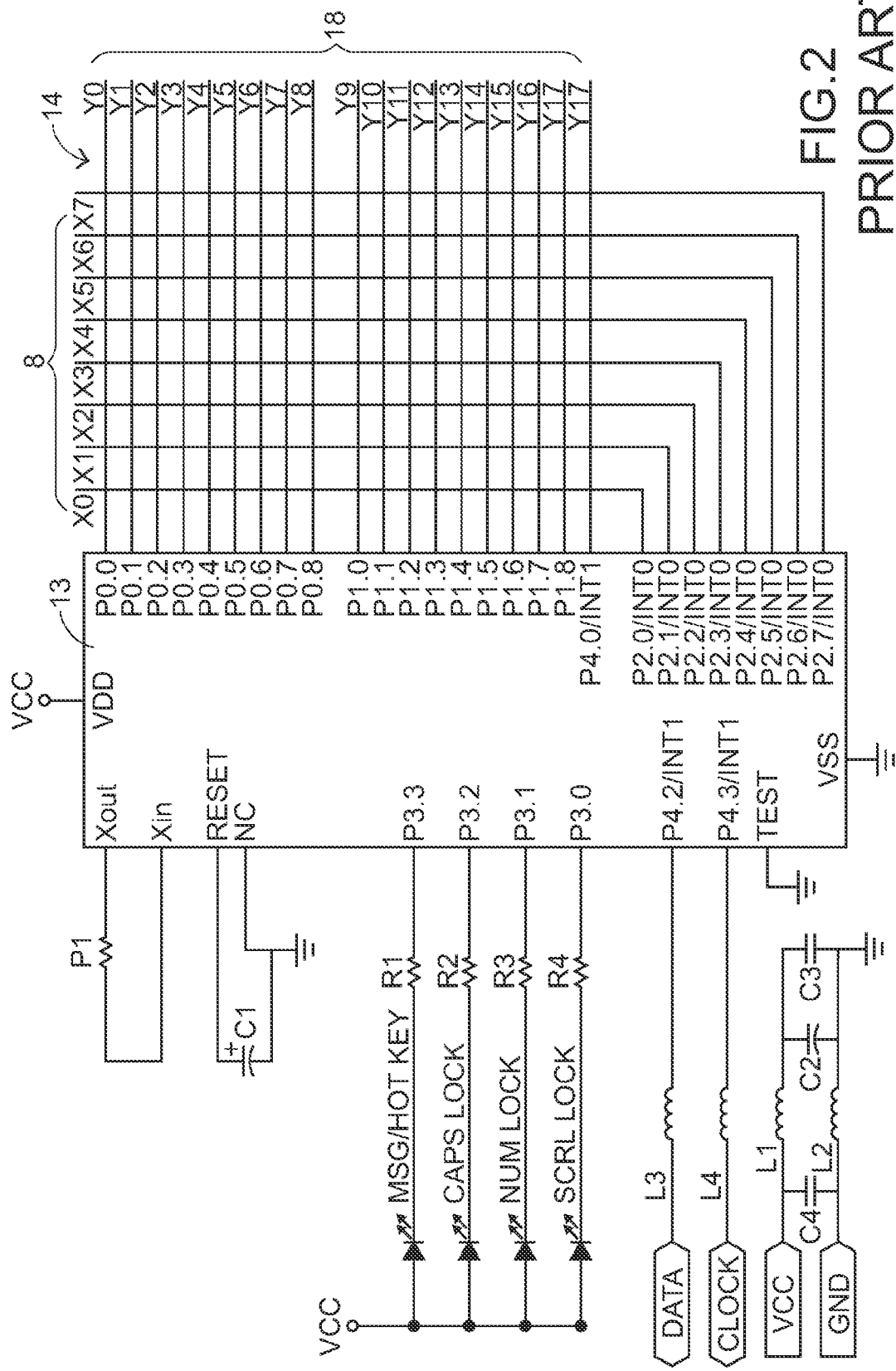
FIG. 2 is a schematic circuit diagram illustrating the internal circuitry of the conventional keyboard device.
Figure 3:
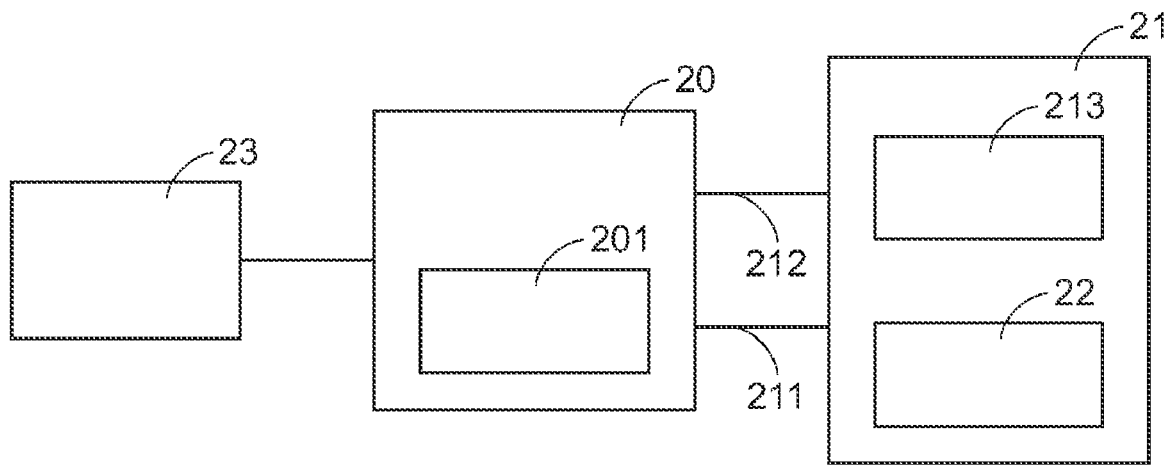
FIG. 3 is a schematic function block diagram illustrating an automatic keyboard testing system according to an embodiment of the present invention.

For obviating the drawbacks encountered from the prior art, the present invention provides an automatic keyboard testing system without the need of the human testing operations. FIG. 3 is a schematic function block diagram illustrating an automatic keyboard testing system according to an embodiment of the present invention. As shown in FIG. 2, the automatic keyboard testing system 2 comprises a computer 20, an automatic testing program 201, a testing frame 21 and a monitor 23. The keyboard circuit board 22 is placed on the testing frame 21 in order to be tested. The keyboard circuit board 22 comprises multiple key intersection points. Every key intersection point is correlated to a specified key scanning code. The automatic testing program 201 is installed in the computer 20 for generating a testing signal. A predetermined time period is set by the automatic testing program 201. The testing frame 21 is connected to the computer 20 and the keyboard circuit board 22. According to the testing signal, the testing frame 21 generates a simulating signal, and the key intersection point corresponding to the simulating signal is conducted. As such, the keyboard circuit board 22 outputs a key scanning code corresponding to the conducted key intersection point to the computer 20. A testing interface 231 is shown on the monitor 23. Via the testing interface 231, the tester can realize the testing result.

Figure 4:
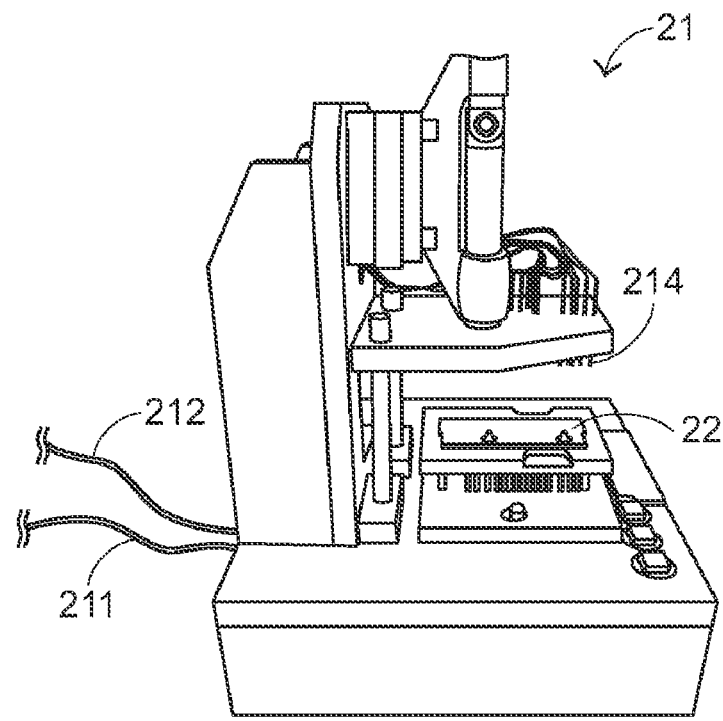
FIG. 4 is a schematic perspective view illustrating the outward appearance of a testing frame of the automatic keyboard testing system according to an embodiment of the present invention.

FIG. 4 is a schematic perspective view illustrating the outward appearance of a testing frame of the automatic keyboard testing system according to an embodiment of the present invention. Please refer to FIGS. 3 and 4. The testing frame 21 comprises a control panel 213, multiple thimbles 214, a power wire 211 and a signal wire 212. According to the testing signal, the control panel 213 outputs the corresponding simulating signal. The power wire 211 is connected with the computer 20 for transmitting electricity to the testing frame 21. The signal wire 212 is connected with the computer 20 for transmitting testing signal. The thimbles 214 are in contact with the keyboard circuit board 22 for transmitting the simulating signal to the keyboard circuit board 22. In this embodiment, the power wire 211 is a universal serial bus (USB) connecting wire, and the signal wire 212 is a RS232 connecting wire.

Moreover, the keyboard circuit board 22 includes multiple scan input lines and multiple scan output lines. The scan input lines and the scan output lines collectively define the multiple key intersection points. In a case that the keyboard circuit board 22 has 8 scan input lines and 18 scan output lines to be formed as an 8×18 matrix, the keyboard circuit board 22 has 144 key intersection points correlating to 144 keys.

The automatic testing program 201 has a predetermined testing script. According to the testing script, the automatic testing program 201 generates a corresponding testing signal. The keys to be tested and the sequence of testing these keys are written into the testing script. In an embodiment, there are 18 key intersection points to be tested by the automatic testing program 201. These 18 key intersection points are located at 18 different scan output lines. Since the key intersection points are defined by scan input lines and scan output lines, the functions of the keyboard circuit board 22 could by realized by testing only the 18 key intersection points.

Hereinafter, the operations of the automatic keyboard testing system 2 will be illustrated in more details with reference to FIGS. 3 and 4.

First of all, the automatic testing program 201 generates a testing signal to the testing frame 21 according to the testing script. After the testing signal is received by the testing frame 21, the testing frame 21 generates a corresponding simulating signal. The key intersection point corresponding to the simulating signal is conducted by the testing frame 21. As such, the keyboard circuit board 22 outputs a key scanning code corresponding to the conducted key intersection point to the computer 20. If the key scanning code has not been transmitted to the computer 20 within the predetermined time period, the automatic testing program 201 discriminates an erroneous test. Whereas, if the key scanning code is transmitted to the computer 20 within the predetermined time period, the automatic testing program 201 will discriminate whether the key scanning code is accurate. For discriminating whether the key scanning code is accurate, the automatic testing program 201 further comprises a key scanning code table. According to the testing script and the key scanning code table, the automatic testing program 201 could discriminate whether the key scanning code is accurate.

Figure 5:
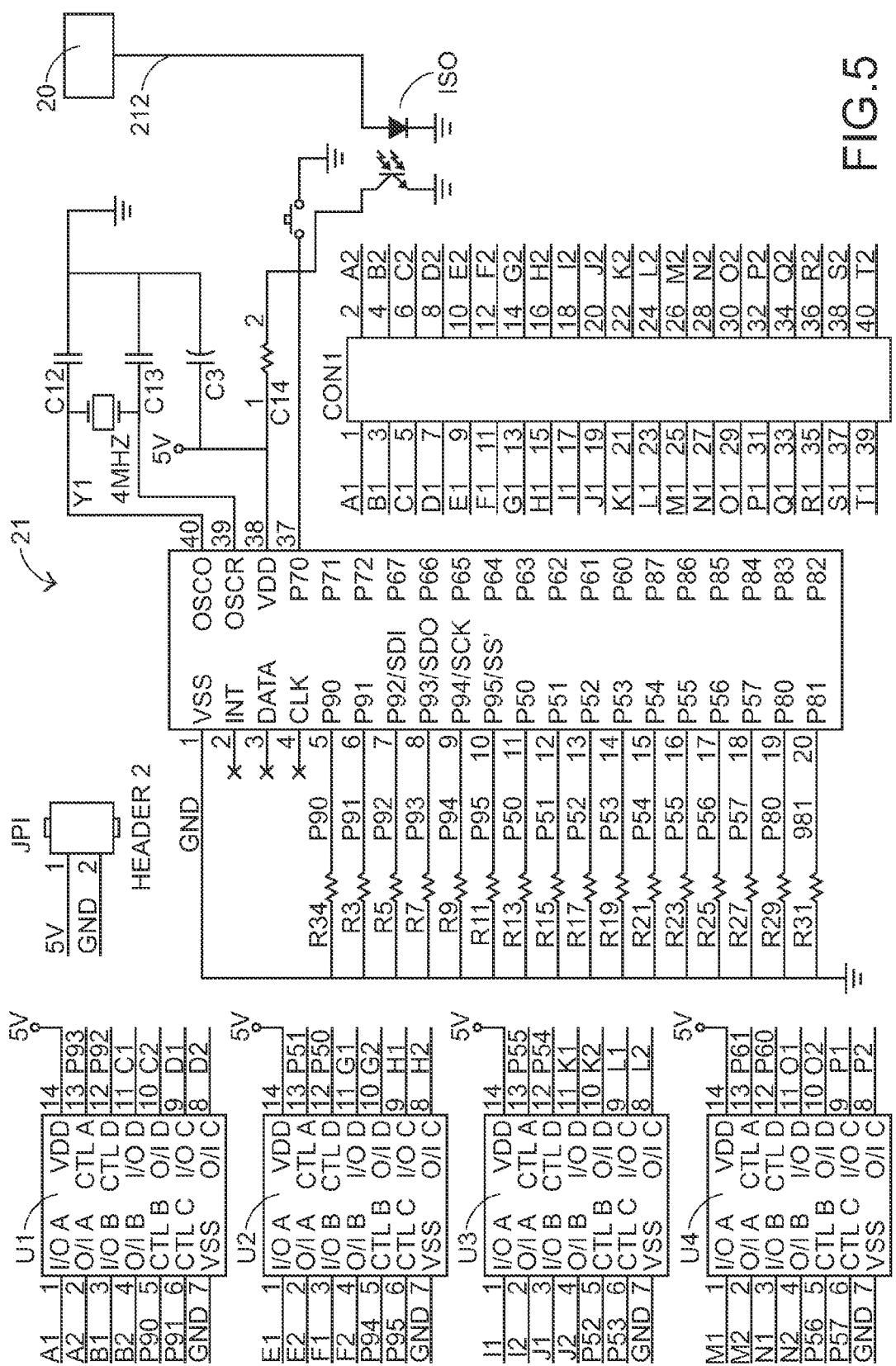
FIG. 5 is a schematic circuit diagram illustrating the internal circuitry of the testing frame of the automatic keyboard testing system according to an embodiment of the present invention.

FIG. 5 is a schematic circuit diagram illustrating the internal circuitry of the testing frame of the automatic keyboard testing system according to an embodiment of the present invention. The signal wire 212 is connected with the computer 20. The signal wire 212 is connected to the control panel 213 through a photo transistor ISO. The control panel 213 comprises several analog switches U1~U4. The analog switches U1~U4 are connected with the thimbles 214. When the keyboard circuit board 22 is placed on the testing frame 21 and contacted with the thimbles 214, the analog switches U1~U4 are connected with multiple key intersection points. As such, multiple scan input lines (A1, B1, C1, D1~H1) and multiple scan output lines (A2, B2, C2, D2~R2) are connected with the testing frame 21. Examples of the analog switches U1~U4 include but are not limited to CD4066 switches.

In an embodiment, the keys to be tested are written into the testing script and include the keys A, B, C, D, E, F, G, H, I, J, K, L, M, N, O, Num Lock, Caps Lock and Scroll Lock. These keys correlate to the key intersection points defined by the multiple scan input lines and the multiple scan output lines. For example, the scan input line A1 and the scan output line A2 collectively define a key intersection point correlating to the key A. When the key intersection point correlating to the key A is conducted, it is meant that the scan input line A1 and the scan output line A2 are both conducted. As such, the keyboard circuit board 22 outputs a key scanning code A1A2 to the computer 20. The rest may be deduced by analogy. These key scanning codes are stored in the key scanning code table in order to be inquired and compared by the automatic testing program 201.

Figure 6A:
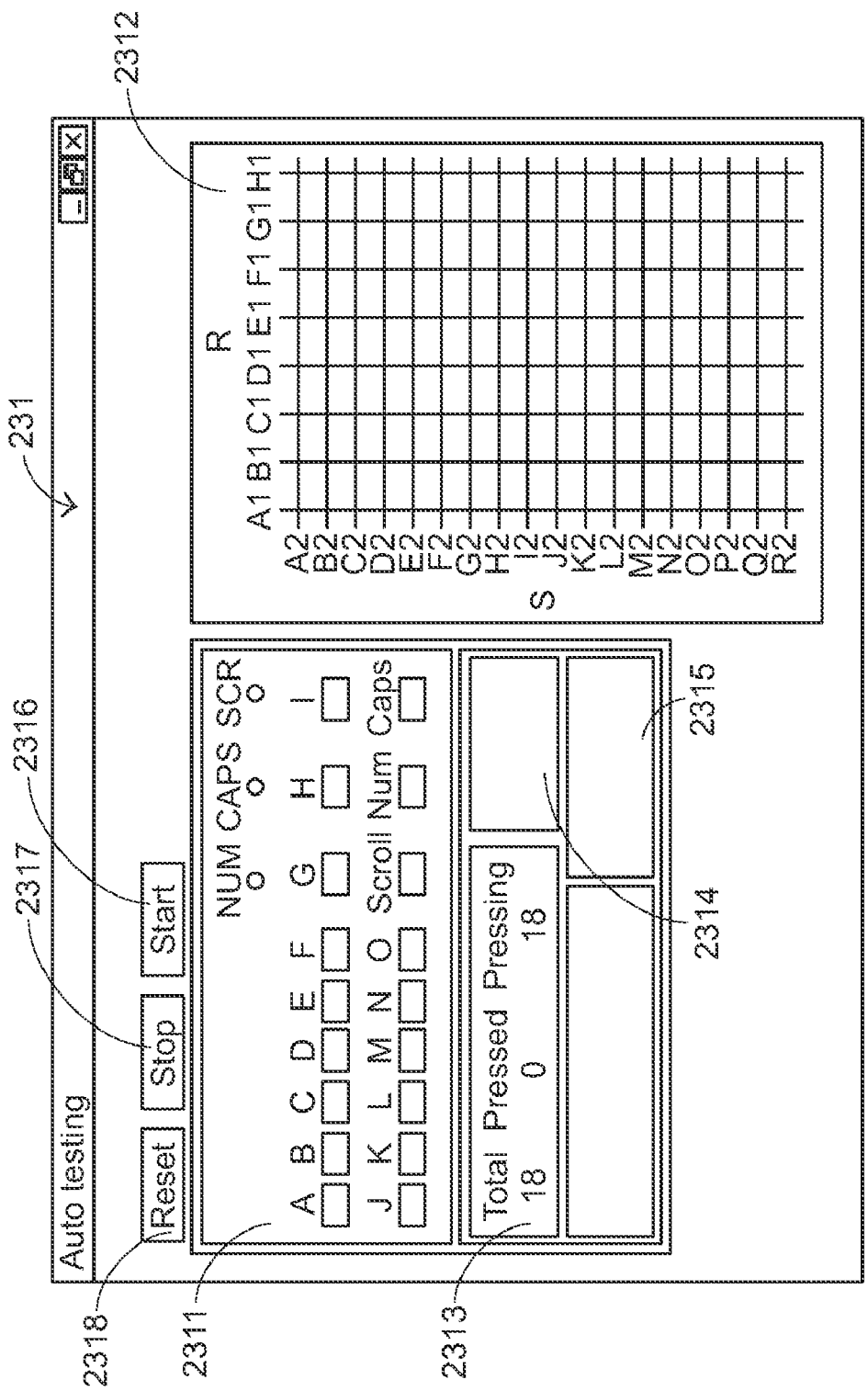
FIGS. 6A, 6B, 6C and 6D schematically illustrate the testing interfaces of the automatic keyboard testing system during the process of testing the keyboard circuit board.

FIGS. 6A, 6B, 6C and 6D schematically illustrate the testing interfaces of the automatic keyboard testing system during the process of testing the keyboard circuit board. After the automatic testing program 201 is activated, a testing interface 231 is shown on the monitor 23. As shown in FIG. 6A, the testing interface 231 includes a testing key zone 2311, a key intersection point zone 2312, a testing key number indicating zone 2313, a testing status zone 2314, an abnormal status indicating zone 2315, a start selective item 2316, a stop selective item 2317 and a reset selective item 2318. The keys to be tested (including A, B, C, D, E, F, G, H, I, J, K, L, M, N, O, Num Lock, Caps Lock and Scroll Lock) are shown on the testing key zone 2311. The scan input lines (A1~H1) and the scan output lines (A2~R2) are shown on the key intersection point zone 2312. The total number of keys to be tested, the number of depressed keys and the non-depressed keys are shown on the testing key number indicating zone 2313. The testing result is shown on the testing status zone 2314. The error message is shown on the abnormal status indicating zone 2315. When the start selective item 2316 is clicked, the automatic testing process is started. When the stop selective item 2317 is clicked, the automatic testing process is stopped. When the reset selective item 2318 is clicked, all zones are initiated in order to re-test the current keyboard circuit board or test the next keyboard circuit board.

Hereinafter, the use of the automatic keyboard testing system 2 to test a keyboard circuit board will be illustrated in more details with reference to FIGS. 3, 4, 5, 6A, 6B, 6C and 6D. First of all, the keyboard circuit board 22 is placed on the testing frame 21 and contacted with the thimbles 214 (see FIG. 4). Next, the automatic testing program 201 is activated, and thus a testing interface 231 is shown on the monitor 23 (see FIG. 6A). After the start selective item 2316 of the testing interface 231 is clicked, the automatic testing program 201 is activated and a testing signal is generated to test the key A, thereby automatically testing the keyboard circuit board 22. The testing signal is transmitted to the control panel 213 through the signal wire 212. According to the testing signal, the photo transistor ISO is conducted and the control panel 213 generates a simulating signal to the analog switch U1, which is connected with the scan input line A1 and the scan output line A2. According to the simulating signal, the key intersection point correlating to the key A is conducted. In other words, the scan input line A1 and the scan output line A2 are both conducted and thus the keyboard circuit board 22 outputs a key scanning code corresponding to the key intersection point (e.g. A1A2) to the computer 20.

Figure 6B:
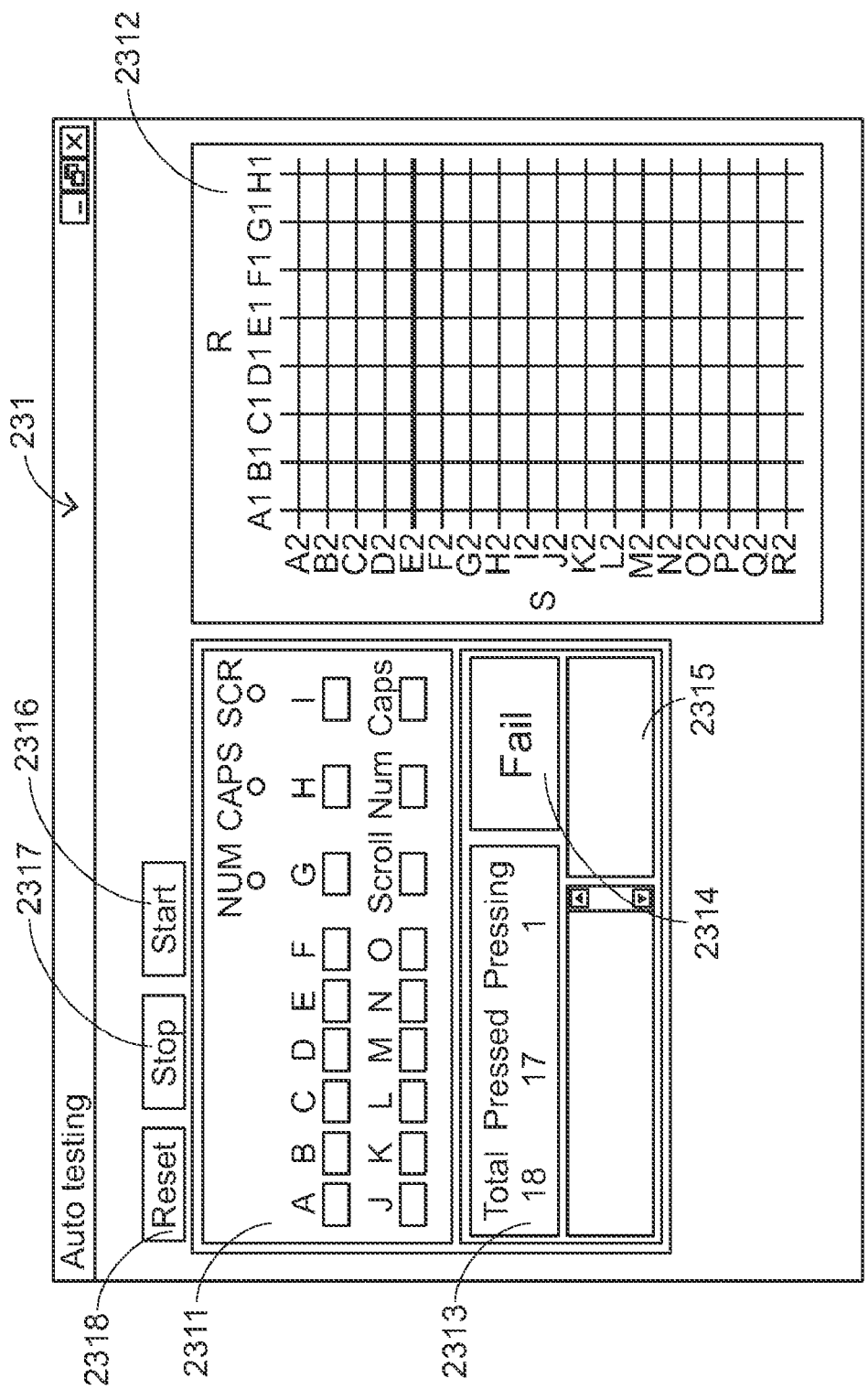
Figure 6C:
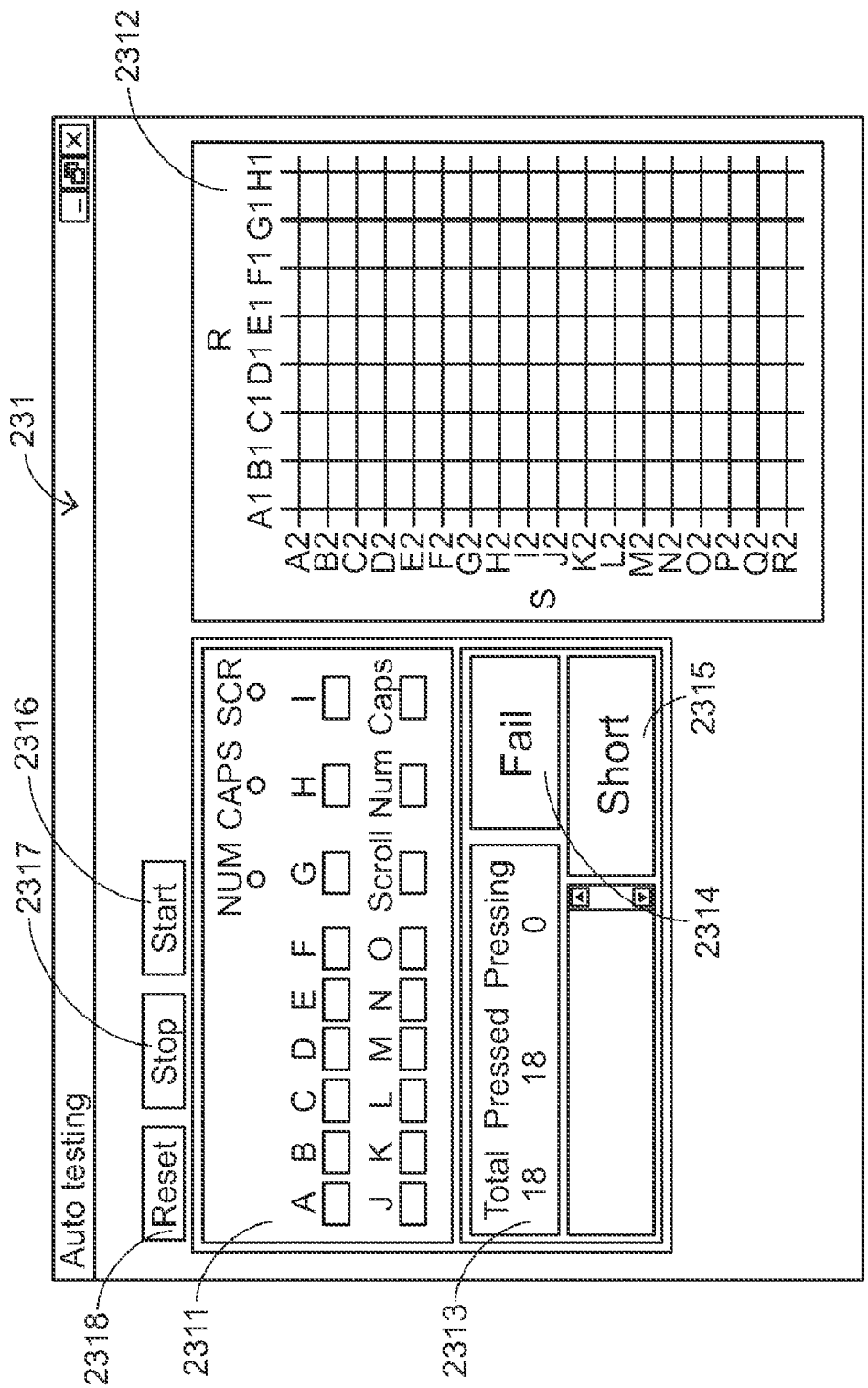
Figure 6D:
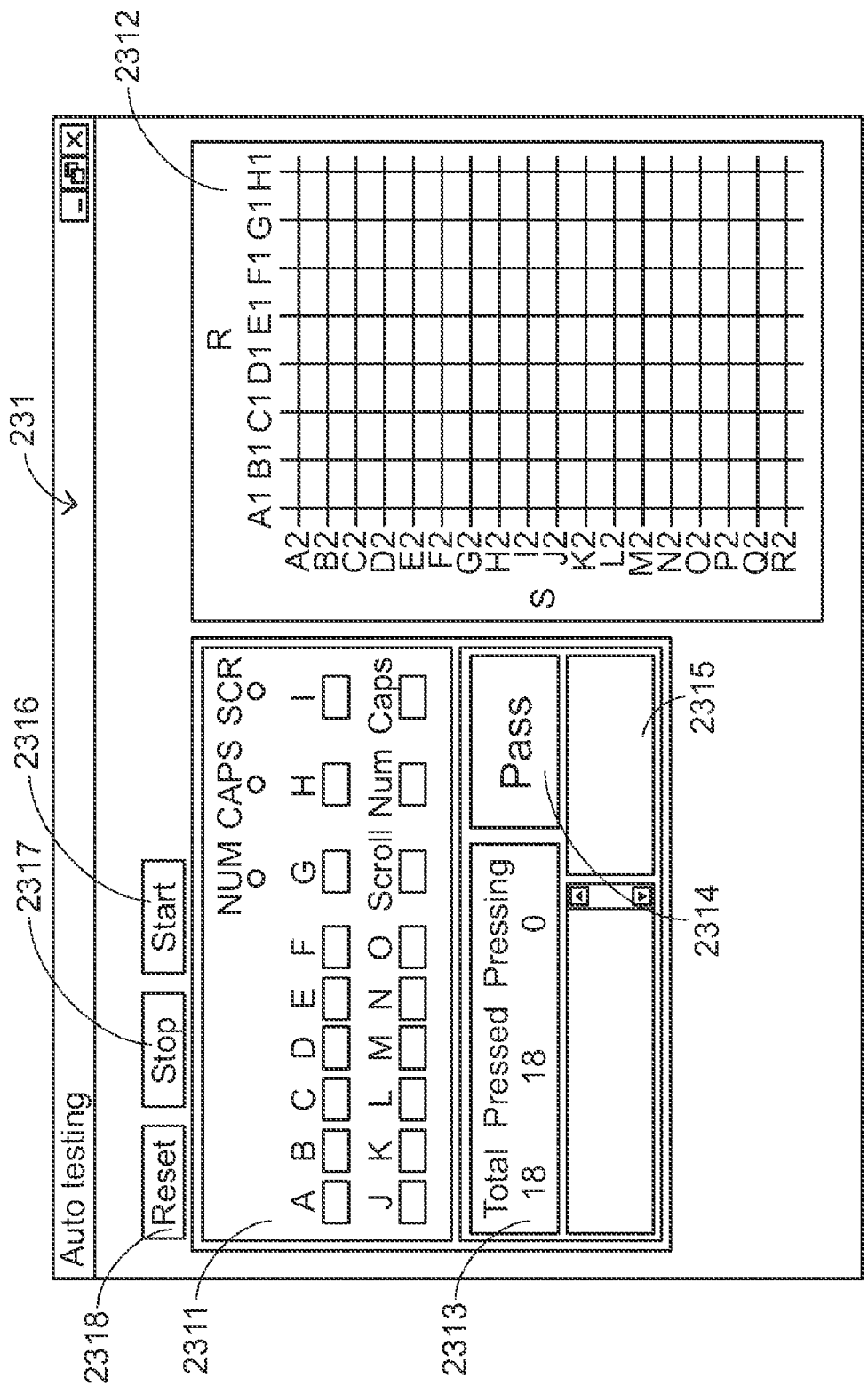

If the key scanning code has not been transmitted to the computer 20 within the predetermined time period, the automatic testing program 201 will output an error message, which is also shown in the testing status zone 2314 (see FIG. 6B). Moreover, as shown in the testing key number indicating zone 2313 of the testing interface 231, the total number of keys to be tested, the number of depressed keys and the non-depressed keys are respectively 18, 17 and 1. It is meant that a key has not been tested. From the testing key zone 2311, it is found that the unmarked key (i.e. the key E) has not been tested. From the key intersection point zone 2312, it is found that the scan output line E2 is erroneous.

If the key scanning code is transmitted to the computer 20 within the predetermined time period, the automatic testing program 201 will discriminate whether the key scanning code is accurate. According to the testing script and the key scanning code table, the automatic testing program 201 could discriminate whether the key scanning code is accurate. Once the key scanning code is determined as an erroneous code, an error message is shown in the testing status zone 2314 (see FIG. 6C). In addition, the abnormal status indicating zone 2315 of the testing interface 231 indicates a short-circuited status. The scan input line GI is marked in a different color to indicate that the scan input line G1 is in the short-circuited status. Once the key scanning code is determined as an accurate code, the automatic testing program 201 will output a passing message, which is also shown in the testing status zone 2314 (see FIG 6D).

From the above description, the automatic keyboard testing system 2 is capable of automatically testing the keyboard circuit board 22. The use of the testing frame 21 to conduct a key intersection point simulates the depressing action of a key. In addition, the automatic testing program 201 could time and discriminate whether the tested key intersection point is accurate in order to implement the whole automatic testing process. Through the power wire 211, the testing frame 21 could receive electricity from the computer 20 without the need of connecting to other external power source. In comparison with the prior art technology, the accuracy and speed of automatically testing the keyboard circuit board 22 by the automatic keyboard testing system 2 of the present invention are both enhanced. Moreover, the tester could realize the errors present in the keyboard circuit board 22 via the testing interface 231. As a consequence, the erroneous portion of the keyboard circuit board 22 could be debugged in order to save time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic keyboard testing system for automatically testing a keyboard circuit board of a keyboard device, said keyboard circuit board comprising multiple key intersection points correlating to respective key scanning codes, said automatic keyboard testing system comprising:
    a computer;
    an automatic testing program installed in said computer for generating a testing signal and having a predetermined time period; and
    a testing frame connected to said computer and said keyboard circuit board for generating a simulating signal according to said testing signal and conducting a key intersection point corresponding to said simulating signal, so that said keyboard circuit board output a key scanning code corresponding to said conducted key intersection point to said computer, wherein said automatic testing program outputs an error message if said key scanning code has not been transmitted to the computer within said predetermined time period, wherein said testing frame further comprises:
    a control panel for generating said simulating signal according to said testing signal;
    multiple thimbles contacted with said keyboard circuit board for transmitting said simulating signal to said keyboard circuit board;
    a power wire connected with said computer for transmitting electricity from said computer to said testing frame; and
    a signal wire connected with said computer for transmitting said testing signal;
    wherein said control panel further comprises an analog switch connected with said thimbles, wherein said analog switch is connected with multiple key intersection points after said keyboard circuit board is placed on said testing frame and contacted with said thimbles.

2. The automatic keyboard testing system according to claim 1 wherein said automatic testing program discriminates whether said key scanning code is accurate if said key scanning code is transmitted to said computer within said predetermined time period.

3. The automatic keyboard testing system according to claim 2 wherein said automatic testing program further outputs said error message once said key scanning code is determined as an erroneous code, or said automatic testing program outputs passing message once said key scanning code is determined as an accurate code.

4. The automatic keyboard testing system according to claim 3 wherein said automatic testing program has a predetermined testing script, and said automatic testing program generates said testing signal according to said testing script.

5. The automatic keyboard testing system according to claim 4 wherein said automatic testing program further comprises a key scanning code table, and said automatic testing program discriminates whether said key scanning codes are accurate according to said testing script and said key scanning code table.

6. The automatic keyboard testing system according to claim 1 wherein said power wire is a universal serial bus (USB) connecting wire.

7. The automatic keyboard testing system according to claim 1 wherein said testing signal is transmitted from said automatic testing program to said control panel through said signal wire after said signal wire is connected with said computer.

8. The automatic keyboard testing system according to claim 1 wherein said signal wire is a RS232 connecting wire.

9. The automatic keyboard testing system according to claim 1 wherein when said control panel receives said testing signal and outputs said simulating signal, said key intersection point corresponding to said simulating signal is conducted by said analog switch according to said simulating signal.

10. The automatic keyboard testing system according to claim 1 wherein said analog switch is a CD4066 switch.

11. The automatic keyboard testing system according to claim 1 wherein said computer is also connected with a monitor, and a testing interface is shown on said monitor.

12. An automatic keyboard testing system for automatically testing a keyboard circuit board of a keyboard device, said keyboard circuit board comprising multiple key intersection points correlating to respective key scanning codes, said automatic keyboard testing system comprising:
    a computer wherein said computer is also connected with a monitor, and a testing interface is shown on said monitor wherein said testing interface includes a testing key zone, a key intersection point zone, a testing key number indicating zone and a testing status zone;
    an automatic testing program installed in said computer for generating a testing signal and having a predetermined time period; and
    a testing frame connected to said computer and said keyboard circuit board for generating a simulating signal according to said testing signal and conducting a key intersection point corresponding to said simulating signal, so that said keyboard circuit board output a key scanning code corresponding to said conducted key intersection point to said computer, wherein said automatic testing program outputs an error message if said key scanning code has not been transmitted to the computer within said predetermined time period.

13. The automatic keyboard testing system according to claim 12 wherein said key intersection points are defined by multiple scan input lines and multiple scan output lines.

14. The automatic keyboard testing system according to claim 13 wherein said key intersection points are defined by eight scan input lines and eighteen scan output lines.

* * * * *